United States Patent [19]
Vallee

[11] Patent Number: 5,653,164
[45] Date of Patent: Aug. 5, 1997

[54] STEAM GENERATOR FOR CONVECTION OVEN

[75] Inventor: Serge C. Vallee, Drummondville, Canada

[73] Assignee: Premark FEG L.L.C., Wilmington, Del.

[21] Appl. No.: 335,162

[22] Filed: Nov. 7, 1994

Related U.S. Application Data

[62] Division of Ser. No. 176,791, Jan. 3, 1994, Pat. No. 5,394,791.

[51] Int. Cl.$^6$ ............................................. A21B 1/00
[52] U.S. Cl. ........................... 99/476; 99/477; 34/231; 126/20; 138/37; 138/38; 138/108
[58] Field of Search .................... 34/231; 99/352, 99/427, 448, 476, 477; 126/20, 355, 359; 122/31.1, 35; 138/38; 366/338; 165/4, 9.1, 10, 10 A, 109.1, 902

[56] References Cited

U.S. PATENT DOCUMENTS

| | | | |
|---|---|---|---|
| 1,313,624 | 8/1919 | Evans et al. | 138/38 |
| 1,878,519 | 9/1932 | Hoppe . | |
| 2,767,667 | 10/1956 | Spooner . | |
| 3,627,036 | 12/1971 | Gilbert | 165/10 |
| 3,826,240 | 7/1974 | Miyahara . | |
| 3,954,053 | 5/1976 | Johnsson . | |
| 4,202,259 | 5/1980 | Johnsson . | |
| 4,753,220 | 6/1988 | Lutzen | 126/355 |
| 4,784,218 | 11/1988 | Holl | 165/109.1 |
| 5,161,517 | 11/1992 | Johansson | 165/902 |

FOREIGN PATENT DOCUMENTS

| | | | |
|---|---|---|---|
| 2519849 | 5/1975 | Germany . | |
| 2616329 | 4/1976 | Germany . | |
| 532663 | 5/1970 | Switzerland . | |
| 548161 | 4/1974 | Switzerland . | |
| 253988 | 3/1970 | U.S.S.R. | 165/9.1 |
| 1312364 | 5/1987 | U.S.S.R. | 165/10 |
| 201029 | 8/1979 | United Kingdom . | |
| WO8401266 | 4/1984 | WIPO . | |

*Primary Examiner*—David Scherbel
*Assistant Examiner*—Randall Chin
*Attorney, Agent, or Firm*—Thompson Hine & Flory LLP

[57] ABSTRACT

A steam generator for use in a convection oven comprising a plurality of first and second spherically shaped heat accumulator elements arranged alternately in a substantially vertical plane in which the first layer contains at least one row of the heat accumulating elements integrally joined together at a central axis and the second layer contains at least two rows of the heat accumulating elements integrally joined together at a central axis, and a convection oven employing the steam generator are disclosed.

14 Claims, 6 Drawing Sheets

5,653,164

STEAM GENERATOR FOR CONVECTION OVEN

This is a division of application Ser. No. 08/176,791, filed Jan. 3, 1994 now U.S. Pat. No. 5,394,791.

BACKGROUND OF THE INVENTION

1. Field of the Invention

This invention relates to a steam generator for use in a convection oven such as that used in a commercial bakery; and to a heat accumulator unit which forms part of the steam generator.

2. Prior Art

When bread is baked in a convection oven in which the bread is contacted with circulating heated air, it is known to introduce steam or water vapor into the oven chamber for a brief period at the beginning of the baking process to impart a desired color and crispness to the crust of the bread.

In Swiss Pat. No. 532,363, water is sprayed on the walls of steaming chambers heated by circulated air to form steam within the oven chamber.

Swiss Pat. No. 548,161 discloses a steam generator which utilizes an independent heater for the steam generator.

In U.S. Pat. No. 2,767,667, a conveyorized oven has a steaming unit located at the entrance to a conveyor and uses a steam generator which is remote from the conveyor or conveyor housing to provide steam for direct application to the bread. There is a fan for circulating the steam over the entering bread remote from the conveyorized baking area of the convection oven.

U.S. Pat. No. 4,202,259 discloses a nonconveyorized convection oven such as a rack oven which employs a steam generating device outside the oven chamber and which needs no secondary fan for forcing circulation, but which is capable of vaporizing water without the use of any auxiliary heater. The steam generator is described as containing a multiplicity of blocks, which may be in the form of metal balls. The multiple blocks are loosely disposed along a linear channel and heated by circulating heated air. At the beginning of the baking process, water is sprayed onto the blocks where a portion of the water is vaporized while the remainder flows through a slot opening and is distributed over the blocks immediately below.

One of the disadvantages of the steam generator described in U.S. Pat. No. 4,202,259 is that the metal balls are loosely disposed in the generator which makes the generator inconvenient to assemble and repair since loose balls may escape and roll across the factory or bakery floor.

SUMMARY OF THE INVENTION

Accordingly, it is an object of the present invention to provide a steam generator for use in a convection oven which is more efficient and which is capable of rapidly vaporizing relatively large amounts of water without use of an external heating device and which is convenient to assemble and repair.

It is another object of the invention to provide a convection oven containing a steam generator which has improved baking capabilities.

It is yet another object of the invention to provide a heat accumulator unit for use in a steam generator which is convenient to store, ship and assemble.

The steam generator in accordance with the invention comprises a plurality of first and second heat accumulator units arranged alternately in a substantially vertical plane, said first heat accumulator unit containing at least one horizontal row of heat accumulator elements and said second heat accumulator unit containing at least two horizontal rows of heat accumulator elements.

In accordance with a preferred embodiment of the invention, the steam generator further comprises a plurality of perforated baffles horizontally disposed between every other heat accumulator unit such that a perforated baffle is located immediately above every first heat accumulator unit and immediately below every second heat accumulator unit;

water supply means at the top of said steam generator for spreading water onto said heat accumulator elements;

cover unit for covering said water supply means;

a base unit located at the bottom of said steam generator, said base unit including means for collecting and draining excess water from said steam generator; and a pair of horizontally spaced apart side panels extending vertically between said base unit and said cover unit for supporting said heat accumulator unit and said baffles, said panels being fixed to opposite ends of said base unit and at corresponding ends of said cover unit.

DETAILED DESCRIPTION OF THE INVENTION

The principles of the steam generator of the present invention are particularly useful when embodied in a convection oven. In a typical operation of a convection oven containing the steam generator of the present invention, the oven is pre-heated to a predetermined temperature for a period of time to allow the steam generator to reach a peak temperature for vaporizing water into steam. The bread or other goods to be baked are loaded onto a wheeled rack and placed in the oven chamber and the oven door is closed. The rack is then lifted off the floor by a lifting device and begins to rotate at a set speed. The steaming process is started by spraying water over the heat accumulating units to produce steam uniformly over the total height of the steam generator. The steam produced infiltrates the entire oven and condenses on the cool surface of the unbaked bread or other goods. At the end of the predetermined steaming period (about 10 to 30 seconds), the flow of water to the steam generator is discontinued and the bake cycle started. During the bake period a fan continuously circulates the heated air throughout the entire system. For additional batches, the procedure is repeated except that it is generally not necessary to pre-heat the oven since the previous baking cycle provides sufficient heat.

Figure 1:
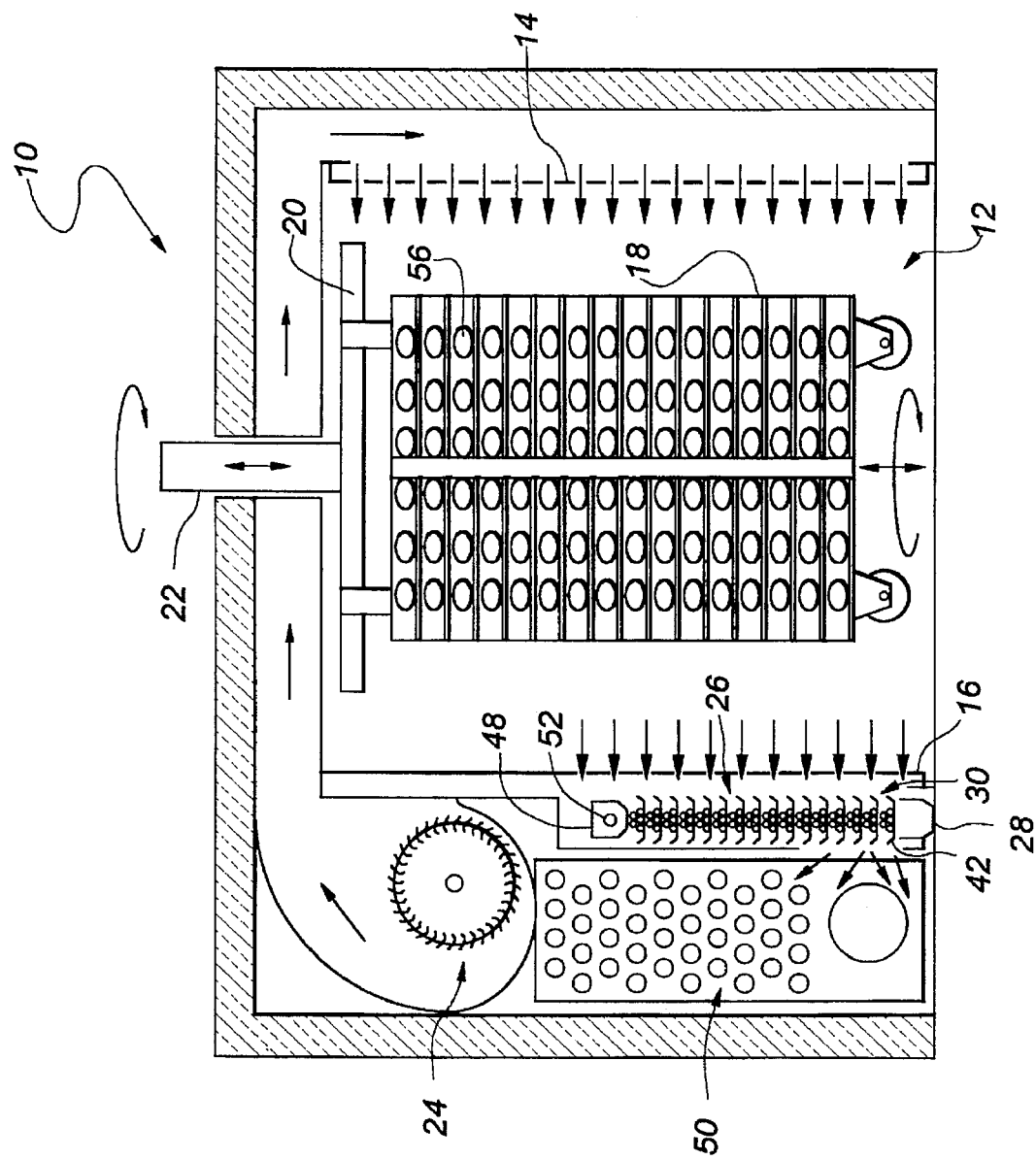
FIG. 1 is a vertical cross-sectional view of an oven embodying the steam generator of the invention.
Figure 2:
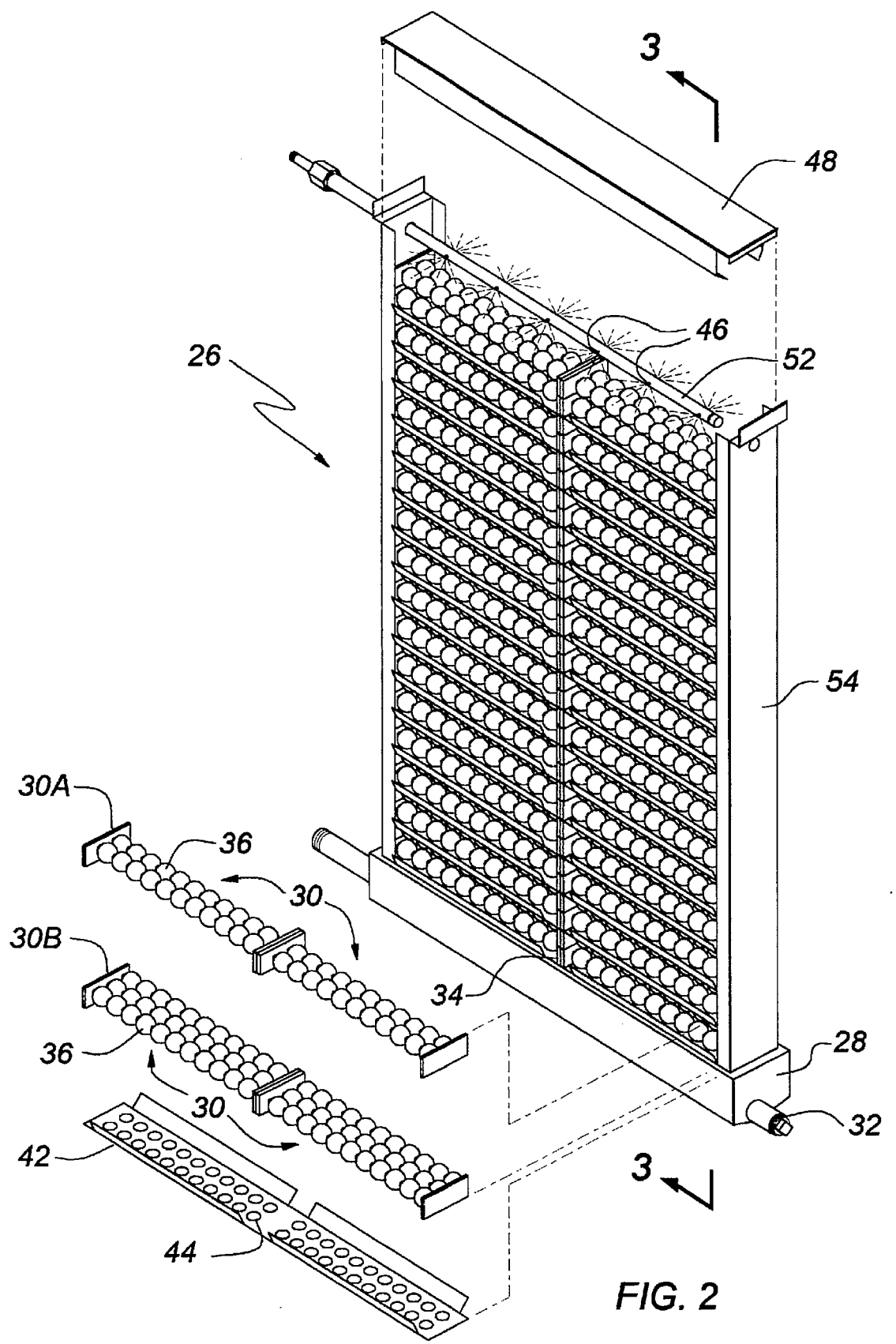
FIG. 2 is a perspective view of the steam generator of the invention in a partially exploded view.

As shown in FIG. 1, a typical oven 10 in accordance with the invention has a chamber 12 including an apertured upstream side 14 and a partially apertured downstream side 16. Disposed within the chamber 12 is a rack 18 connected at its upper end to a rotatably driven carrier 20 carried by a vertical shaft 22. The rack 18 can be raised and lowered by a shift mechanism (not shown) located on the upper end of the shaft 22. Water vapor is absorbed by the heated air from the steam generator 26 which is shown in FIG. 2 and circulated throughout the oven chamber 12 in a closed path by a fan 24. Goods to be baked such as bread 56 are placed in pans held by rack 18 which rotates to uniformly expose the bread 56 to the heated, steam-containing air as it flows through the oven chamber 12.

The steam generator 26 is disposed outside the oven chamber and comprises a base 28 above which are located a plurality of heat accumulator units 30. The base 28, which contains a receptacle 29 and a drain pipe 32, serves as a sump for collecting and draining away any excess water accumulated during the steam forming process. The heat accumulator units 30 are held in place by end panels 54 vertically affixed to each end of the base 28 and to the corresponding ends of the steam generator cover 48. Steam generator cover 48 includes deflector plates which slope downwardly and inwardly. Where the steam generator 26 is of sufficient size to accommodate or require two or more of the heat accumulator units 30 in a head-to-tail arrangement, support panels 34 are vertically affixed to the base 28 and to the cover 48 intermediate the two end panels 54 to support the heat accumulator units 30.

The heat accumulator units 30 comprise a first horizontal unit 30A containing heat accumulator elements 36 which are joined to each other forming a linear horizontal row; and a second horizontal unit 30B of heat accumulator elements 36 joined to each other as in the first horizontal unit 30A. Horizontally disposed baffles 42 containing multiple perforations 44 are placed below each second horizontal unit 30B to aid in the distribution of water to the heat accumulator elements 36, and to uniformly accumulate steam from the top to the bottom of the steam generator 26. The first horizontally disposed unit 30A and the second horizontally disposed unit 30B are illustrated as having two rows and three rows of heat accumulator elements 36, respectively. While 2 rows and 3 rows, respectively are the preferred number of rows for the first and second horizontal units, it is within the scope of the invention for the first horizontal unit 30A to contain X number of rows and for the second horizontal unit 30B to contain a number of rows equal to X+1, where X is about 1 to 3.

Each of the heat accumulator units 30A and 30B comprises a plurality of heat accumulator elements 36 having a spherical shape. The spherically shaped elements 36 are integrally joined together along a central axis in a linear configuration to form the heat accumulator units 30A and 30B. In a preferred aspect of the invention, the heat accumulator units are cast from a thermally conductive metal such as cast iron using a mold having the desired shape and dimensions.

Figure 3:
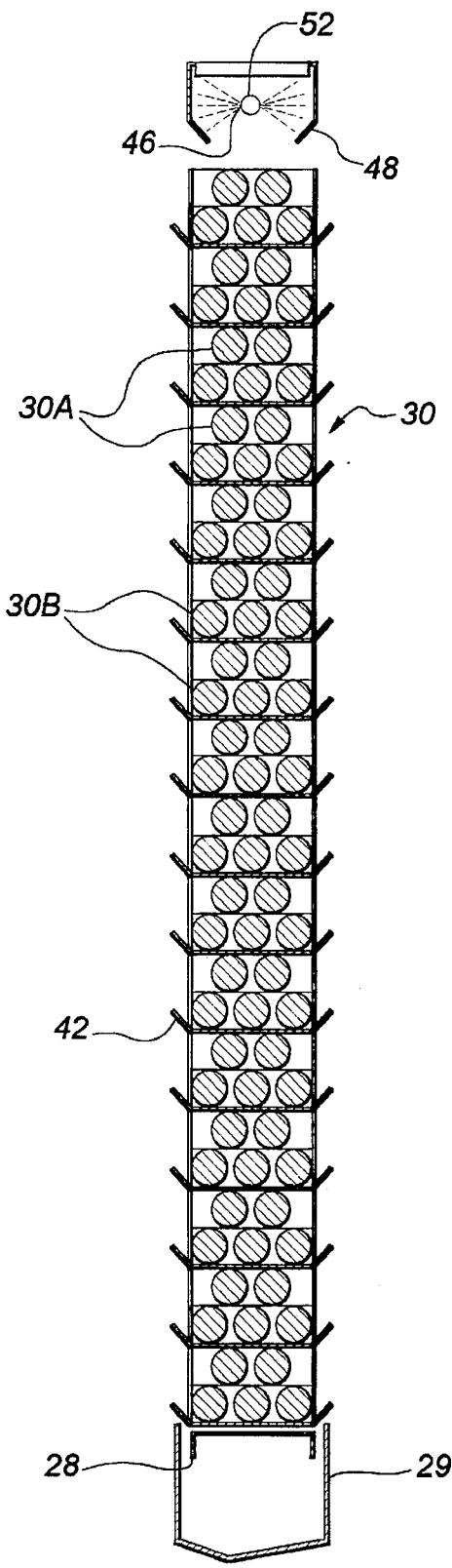
FIG. 3 is a vertical cross-sectional view of the steam generator of the invention taken along line A—A of FIG. 2.

Each of the heat accumulator units 30A and 30B are illustrated in FIGS. 2 and 3 as consisting of two separate units joined together in a head-to-tail relationship with each of the separate units having a length which accommodates eleven heat accumulator elements. Such units are easily assembled and disassembled. While individual units of relatively short dimensions are preferred for the purpose of shipping and handling of the individual components of the steam generator 26, it is to be understood that the heat accumulator units 30A and 30B may consist of longer single units as well as a multiplicity of shorter units. The number of heat accumulator elements 36 present in the heat accumulator units 30A and 30B is not critical, however, for practical purposes each accumulator unit is about 12 to 18 inches in length and preferably about 15 inches in length, and the number of heat accumulator elements 36 of each heat accumulator unit 30 is preferably about 10 to 12 with each element 36 being about 1 to 1.5 inches in diameter, and preferably about 1.25 inches in diameter.

Just prior to the bake cycle, water is provided to the steam generator 26 through apertures 46 in water supply line 52. The water sprayed from aperture 46 is deflected by the sides of steam generator cover 48 and directed downwardly to contact the rows of heat accumulator elements 36. As the water contacts the heat accumulator elements 36, the accumulated heat in the elements 36 is sufficient to transform the water into vapor along the entire height of the steam generator 26. During the steaming cycle (about 15 to 30 second), the fan 24 is stopped to avoid loss of steam in the oven air duct. The moisture-containing air is introduced directly through the apertured downstream side wall 16 and uniformly contacts and condenses on the unbaked and cold bread 56. When the steam cycle is finished, the fan 24 is activated again and the heat exchanger 50 reheats the moisture-laden air. At the beginning of the bake cycle, the fan is activated causing the air flowing through the partially apertured downstream side wall 16 to reheat the steam generator for the next bake as it flows freely between the rows of heat accumulator units 30. The heated, moisture-containing air is circulated through the oven chamber until the baking process has been completed, at which time the baked goods are removed and the oven loaded with another batch to be baked.

Figure 4:
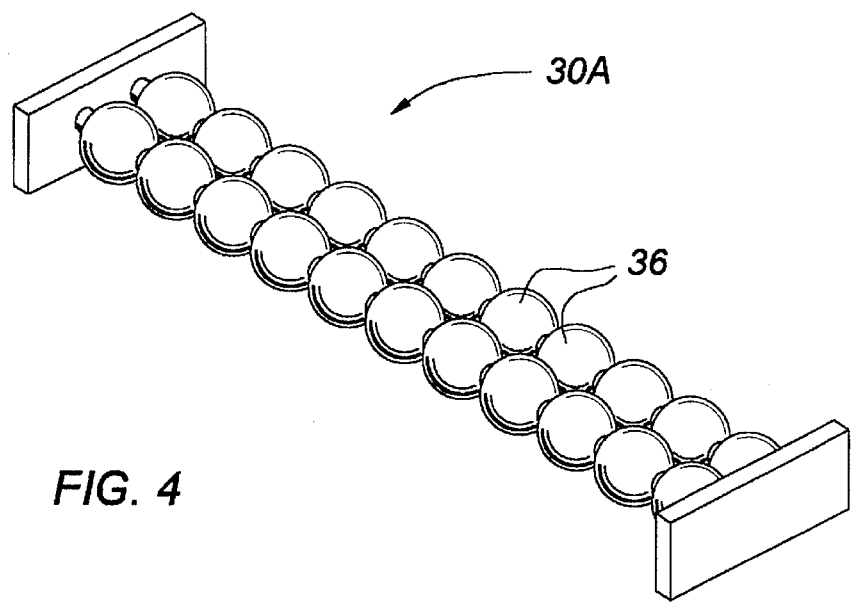
FIG. 4 is a perspective view of a first horizontal unit of heat accumulator elements of the present invention.
Figure 5:
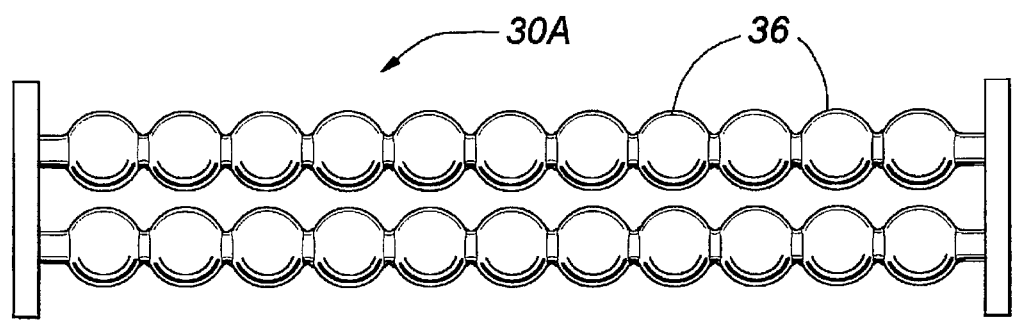
FIG. 5 is a plan view of a first horizontal unit of heat accumulator elements of the present invention.
Figure 6:
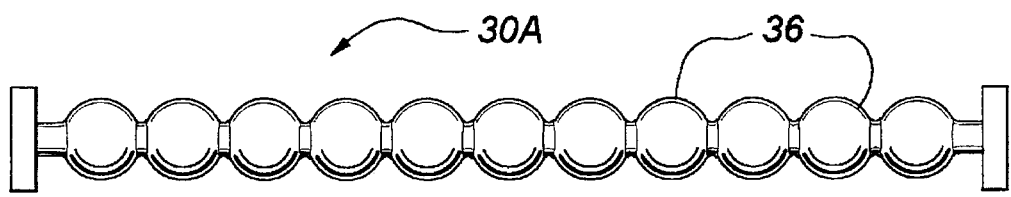
FIG. 6 is a side view of a first horizontal unit of heat accumulator elements of the present invention.
Figure 7:
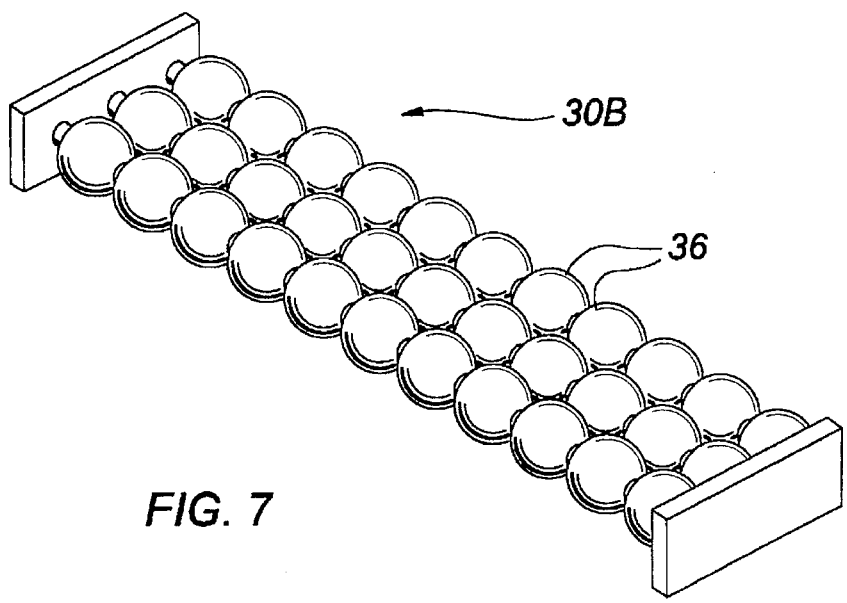
FIG. 7 is a perspective view of a second horizontal unit of heat accumulator elements of the present invention.
Figure 8:
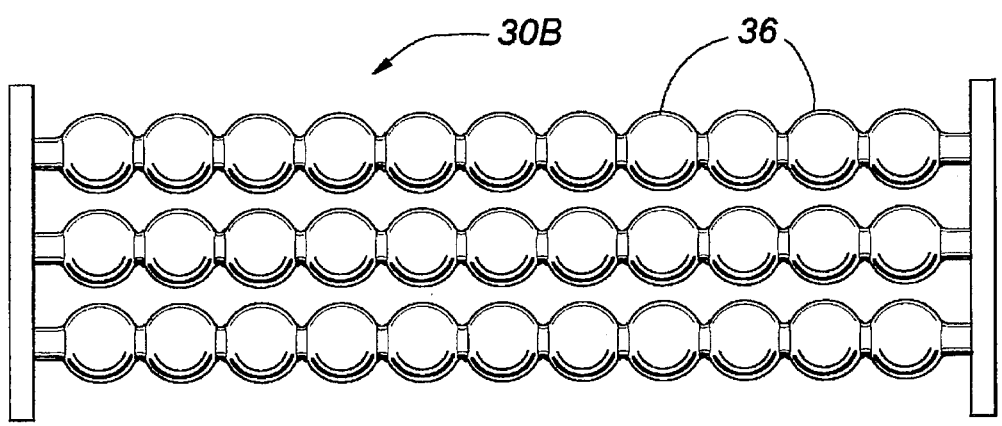
FIG. 8 is a plan view of a second horizontal unit of heat accumulator elements of the present invention.
Figure 9:
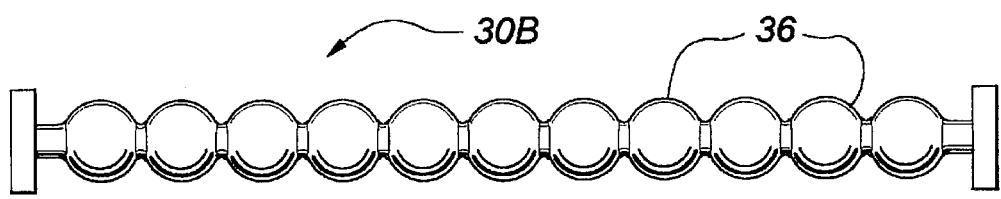
FIG. 9 is a side view of a second horizontal unit of heat accumulator elements of the present invention.

The heat accumulator units 30 are illustrated in more detail in FIGS. 4–9. In FIGS. 4–6, the heat accumulator unit represents a first (or upper) heat accumulator unit 30A which contains two rows of heat accumulator elements 36 joined to each other in a linear configuration. In FIGS. 7–9, the heat accumulator unit represents a second (or lower) heat accumulator unit 30B which contains three rows of heat accumulator elements 36 joined to each other in a linear configuration.

Figure 10:
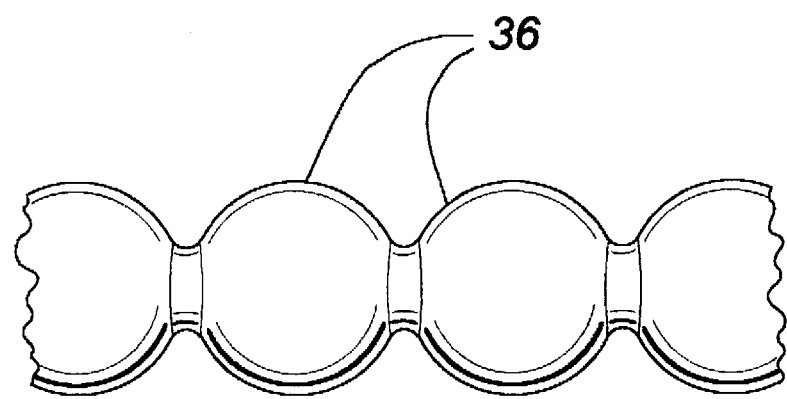
FIG. 10 is an enlarged sectional view of a heat accumulator unit of the present invention.

FIG. 10 is an enlarged section illustrating the attachment of heat accumulator elements 36 to each other in the linear configuration.

The steam generator shown in the drawings is only an exemplary embodiment and, it is to be understood that the invention is not so limited and that changes may be made therein without departing from the scope of the invention which is defined in the appended claims.

What is claimed is:

1. A steam generator for use in a convection oven comprising a plurality of vertically stacked first and second heat accumulator units arranged alternately in a substantial vertical plane, said first heat accumulator unit containing a pair of end blocks having at least one linear row of spherically shaped heat accumulator elements extending between said end blocks, the spherically shaped elements in each row of said first heat accumulator unit being integrally joined together and fixed relative to each other along a horizontal axis and said second heat accumulator unit containing a pair of end blocks having at least two linear rows of spherically shaped heat accumulator elements extending between said end blocks, the spherically shaped elements in each row of said second heat accumulator unit being integrally joined together and fixed relative to each other along a horizontal axis, wherein said first heat accumulator unit can be vertically stacked on said second heat accumulator unit by setting said end blocks of said first heat accumulator unit on said end blocks of said second heat accumulator unit wherein said generator includes a pair of vertical side panels, said side panels having a pair of horizontally extending flanges wherein said end blocks are contained in said side panels between said flanges.

2. The steam generator of claim 1 wherein said first heat accumulator unit contains two linear rows of heat accumulator elements and said second heat accumulator unit contains three linear rows of heat accumulator elements.

3. The steam generator of claim 1 wherein said generator further comprises:

a plurality of perforated baffles horizontally disposed between every other heat accumulator unit such that one of said perforated baffles is located immediately above every first heat accumulator unit and immediately below every second heat accumulator unit;

water supply means at the top of said steam generator for spreading water onto said heat accumulator elements for generating steam;

a cover unit for covering said water supply means;

a base unit located at the bottom of said steam generator, said base unit including means for collecting and draining excess water when generating steam; and a pair of horizontally spaced apart side panels extending vertically between said base unit and said cover unit for supporting said heat accumulator units and said baffles, said panels being fixed to opposite ends of said base unit and fixed to opposite ends of said cover unit.

4. The steam generator of claim 3 wherein said water supply means includes a tubular pipe containing a plurality of apertures, said tubular pipe being connected to a source of water.

5. The steam generator of claim 4 wherein said plurality of apertures are formed bilaterally along said water supply tubular pipe and said cover means includes deflector plates which slope downwardly and inwardly defining a longitudinal opening centrally above a first layer of heat accumulator elements, wherein said deflector plates direct said water to said heat accumulator elements.

6. The steam generator of claim 1 wherein said spherically shaped heat accumulator elements have a diameter of about 1 to 1.5 inches.

7. The steam generator of claim 6 wherein said diameter is about 1.25 inches.

8. The steam generator of claim 1 wherein said first and said second heat accumulator units are cast from a thermally conductive material.

9. The steam generator of claim 8 wherein said material is cast iron.

10. The steam generator of claim 1 wherein said generator further comprises:

water supply means at the top of said steam generator for spreading water onto said heat accumulator units;

a base unit located at the bottom of said steam generator, said base unit including means for collecting and draining excess water from said steam generator.

11. A steam generator for use in a convection oven comprising:

a plurality of first and second heat accumulator units arranged alternately in a substantially vertical plane, said first heat accumulator unit containing two linear rows of spherically shaped heat accumulator elements, the spherically shaped elements in each row of said first heat accumulator unit being integrally joined together and fixed relative to each other along a horizontal axis and said second heat accumulator unit containing three linear rows of spherically shaped heat accumulator elements, the spherically shaped elements in each row of said second heat accumulator unit being integrally joined together and fixed relative to each other along a horizontal axis;

a plurality of perforated baffles horizontally disposed between every other heat accumulator element such that a perforated baffle is located immediately above every first heat accumulator unit and immediately below every second heat accumulator unit;

water supply means at the top of said steam generator for spreading water onto said heat accumulator units;

a cover unit for covering said water supply means;

a base unit located at the bottom of said steam generator, said base unit including means for collecting and draining excess water from said steam generator; and a pair of horizontally spaced apart side panels extending vertically between said base unit and said cover unit for supporting said heat accumulator units and said baffles, said panels being fixed to opposite ends of said base unit and at corresponding ends of said cover unit.

12. The steam generator of claim 11 wherein said water supply means includes a tubular pipe containing a plurality of apertures, said tube being connected to a source of water.

13. The steam generator of claim 12 wherein said plurality of apertures are formed bilaterally along said tubular pipe and said cover unit includes deflector plates which slope downwardly and inwardly defining a longitudinal opening centrally above the heat accumulator elements, wherein said deflector plates direct said water to said heat accumulator units.

14. The steam generator of claim 11 wherein said heat accumulator units are cast from a thermally conductive material.

* * * * *